Figure 1:
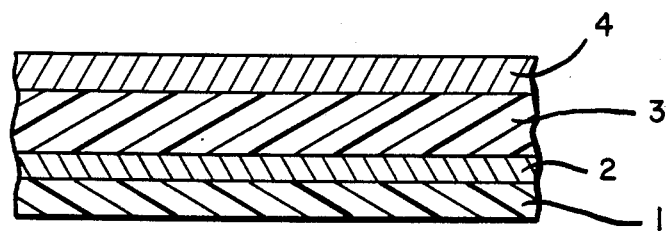

United States Patent [19]

Giglia et al.

[11] 4,170,406
[45] Oct. 9, 1979

[54] ELECTROCHROMIC DEVICES HAVING PROTECTIVE INTERLAYERS

[75] Inventors: Robert D. Giglia, Rye, N.Y.; Richard H. Clasen, West Redding, Conn.

[73] Assignee: American Cyanamid Company, Stamford, Conn.

[21] Appl. No.: 851,071

[22] Filed: Nov. 14, 1977

[51] Int. Cl.² ............................................. G02F 1/17
[52] U.S. Cl. ................................................. 350/357
[58] Field of Search ...................................... 350/357

[56] References Cited

U.S. PATENT DOCUMENTS

| 3,521,941 | 7/1970 | Deb et al. | 350/357 |
| 3,708,220 | 1/1973 | Meyers | 350/357 |
| 4,120,568 | 10/1978 | Deb et al. | 350/357 |

*Primary Examiner*—James W. Davie
*Attorney, Agent, or Firm*—Bruce F. Jacobs; Gordon L. Hart

[57] ABSTRACT

The incorporation of a non-electrochromic layer between the electrochromic material and the electrolyte in an electrochromic device produces longer lasting, more uniform devices.

4 Claims, 2 Drawing Figures

ELECTROCHROMIC DEVICES HAVING PROTECTIVE INTERLAYERS

The invention relates to improvements in electro-optical devices which contain a layer of persistent electrochromic material on one electrode in contact with an electrolyte layer which, in addition, contacts a counterelectrode within the device. The improvement entails placing a non-electrochromic layer between the electrolyte and the electrochromic material. Electrochromic devices operate by passing an electric current between the electrodes, through the electrochromic material, which changes the photoabsorptive characteristics of said material so as to darken or lighten it. Such devices are provided with means both for applying the electric field to the device and for reversing the electric field.

A variety of such devices having numerous uses have been described in the prior art. U.S. Pat. No. 3,708,220, for example, describes electrochromic devices in which a particular gelled electrolyte solution is used.

U.S. Pat. No. 3,521,941, discloses the use of inorganic ion conductors such as silicon oxide, magnesium fluoride, calcium fluoride and the like for electrochromic devices, but without the non-electrochromic layer.

The present invention incorporates a non-electrochromic layer between the electrochromic material and the electrolyte. The non-electrochromic layer is a non-electrochromic version of the electrochromic material.

The incorporation of the non-electrochromic layer yields an electrochromic device which is more stable than previous devices having solid inorganic electrolytes. The use of the same material in the electrochromic and non-electrochromic layers eliminates an uncontrollable potential doping effect which would occur if the two layers were different. The uncontrolled doping can adversely effect the long term switching characteristics of the resultant devices.

It is thus an object of this invention to produce a device which has a longer life than was possible by prior devices.

Figure 2:
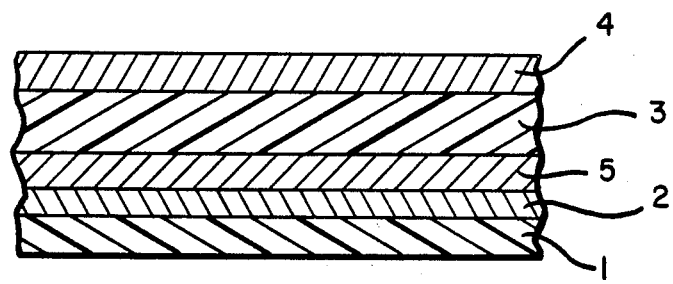

The foregoing and other features, objects and advantages of the present invention will become more apparent from the following detailed description thereof taken in conjunction with the accompanying drawings in which:

FIGS. 1-2 are each cross-sectional views of the various layers making up an electrochromic device, wherein FIG. 1 represents the prior art and FIG. 2 represents the present invention.

FIG. 1 illustrates a prior art electrochromic device which is built by starting with a front electrode layer 1 having an electrode deposited upon a clear glass or plastic material. Then a layer of electrochromic material 2 is deposited upon the electrode. Next a layer of an electrolyte 3 is incorporated, and finally the counter-electrode 4.

FIG. 2 illustrates the incorporation of a non-electrochromic layer 5 between the electrochromic layer 2 and the electrolyte 3.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain, after removal of the electric field, in the the absorptive state to which it is changed, as distinguished from a substantially instantaneous reversion to the initial state, as in the case of the Franz-Keldysh effect.

The materials which form the electrochromic materials of the device in general are electrical insulators or semiconductors. Thus are excluded those metals, metal alloys, and other metal-containing compounds which are relatively good electrical conductors.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry", T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides tellurides, chromates, molybdates, tungstates, vanadates, niobates, tantalates, titanates, stannates, and the like. Particularly preferred are films of metal stannates, oxides and sulfides of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are as disclosed in U.S. Pat. No. 3,521,941, incorporated herein by reference.

While the exact mechanism of persistent electrochromism is unknown, the coloration is observed to occur at the negatively charged electrochromic layer. Generally, the phenomenon of persistant electrochromism is believed to involve transport of cations such as hydrogen or lithium ions to the negative electrode where color centers form in the electrochromic image layer as a result of charge compensating electron flow.

When the persistent electrochromic materials are employed as films, thickness desirably will be in the range of from about 0.1-100 microns. However, since a small potential will provide an enormous field strength across very thin films, the latter, i.e., 0.1-10 microns, are preferred over thicker ones. Optimum thickness will also be determined by the nature of the particular compound being laid down as a film and by the film-forming method, since the particular compound and film-forming method, may place physical (e.g., non-uniform film surface) and economic limitations on manufacture of the devices.

When tungsten oxide is employed as the electrochromic imaging material and an electric field is applied between the electrodes, a blue coloration of the previously colorless electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer is essentially non-absorbent and thus colorless.

The electrodes used herein may be any material which, relative to the electrochromic film, is electrically conducting. These electrically conductive materials are generally coated on a suitable substrate material such as glass, wood, paper, plastics, plaster and the like, including transparent, translucent, opaque or other optical quality materials. At least one of the electrode-substrate combinations is transparent, though both may be.

The electrolyte used herein is the "current carrier permeable insulators" of U.S. Pat. No. 3,521,941. Suitable materials include silicon oxide, calcium fluoride, magnesium fluoride. Also included are other metal oxides or sulfides prepared by oxidizing or sulfiding a metal surface such that the insulator is formed directly in the device. Examples include the above materials as well as aluminum oxide and other inorganic insulators such as selenide, arsenide, nitride, chloride, fluoride, bromide, and carbide materials.

The non-electrochromic layer used herein is of the same material as the electrochromic layer and it is put in intimate contact with the electrochromic layer. The material is deemed non-electrochromic in that it does not color under the influence of an electric field in an essentially dry (less than about 5% water) device under normal electrochromic device operating voltages. The non-electrochromic layer is basically a more highly oxidized version of the same material which serves as the electrochromic material. It may be prepared by depositing the material at a slower rate than the electrochromic layer and in an oxidizing atmosphere, as opposed to a reducing or neutral atmosphere. While any of the materials which may be used for the electrochromic layer may also be used for the non-electrochromic layer, preferably tungstic oxide is used for both.

The devices of the present invention may be conveniently built by depositing one layer upon the other using standard vacuum deposition techniques until the desired structure is created.

The following specific examples are given to illustrate the invention further and to show specific embodiments and modes of practice of the invention and are not intended to be limitative.

EXAMPLE 1

An electrochromic controlled transmission device was prepared as follows:

A 2000 Å layer of electrochromic tungsten oxide was deposited on a sheet of transparent, conductive indium oxide glass. Atop the electrochromic layer, 650 Å of non-electrochromic tungstic oxide (highly oxidized) was deposited by thermal evaporation at $1.7 \times 10^{\times 4}$ torr at a rate of 3 Å/second and using an oxygen bleed. Then 1600 Å of silicon oxide was deposited followed by 120 Å of gold. The gold layer served as the counterelectrode.

A second device was prepared in the same manner as the first except omitting the non-electrochromic layer.

The two devices were tested by applying a D.C. potential between the indium oxide and gold layers. In order to color the device and reduce transmission of light, the indium oxide layer was made negative, and to clear or improve transmission, the indium oxide was made positive. A period of coloring and clearing is called a switching cycle. A charge of about 15 $MC/CM^2$ of active area was passed during each half cycle. The device having the non-electrochromic layer operated more than 2000 switching cycles while the device not including the non-electrochromic layer failed before 500 cycles.

EXAMPLE 2

The procedures of Example 1 are repeated except that magnesium fluoride (1800Å) is used in place of the silicon oxide. Similar comparative results are obtained.

What is claimed is:

1. An electrochromic device comprising an electrode having an electrically conductive surface, a layer of persistent electrochromic compound in contact on one of its sides with said conductive surface of said electrode, and on its opposite side with a layer of a non-electrochromic compound having the same composition as said electrochromic compound except being more highly oxidized hence non-electrochromic, said non-electrochromic layer being in contact on its opposite side with a current carrier permeable insulator layer which on its opposite side is in contact with a counter electrode layer and means for selectively applying electrical fields of opposite polarity across said electrodes.

2. The device of claim 1 wherein the defined electrochromic compound is tungsten oxide and said non-electrochromic compound is a tungsten oxide in a higher oxidation state.

3. The device of claim 1 wherein the current carrier insulator layer is selected from the group consisting of silicon oxide, calcium fluoride and magnesium fluoride.

4. The device of claim 1 wherein the current carrier insulator layer is silicon oxide.

* * * * *